(12) United States Patent
Tong

(10) Patent No.: US 6,796,752 B2
(45) Date of Patent: Sep. 28, 2004

(54) CUTTING INSERT

(75) Inventor: Nelson Pao Chung Tong, Massillon, OH (US)

(73) Assignee: Manchester Tool Company, Akron, OH (US)

( * ) Notice: Subject to any disclaimer, the term of this patent is extended or adjusted under 35 U.S.C. 154(b) by 199 days.

(21) Appl. No.: 10/174,799

(22) Filed: Jun. 19, 2002

(65) Prior Publication Data

US 2003/0235475 A1 Dec. 25, 2003

(51) Int. Cl.⁷ .............................................. B23B 27/22
(52) U.S. Cl. ........................ 407/116; 407/114; 407/115
(58) Field of Search ................................ 407/114, 116, 407/117, 115

(56) References Cited

U.S. PATENT DOCUMENTS

| | | | |
|---|---|---|---|
| 4,626,140 A | | 12/1986 | Zweekly et al. |
| 4,844,668 A | | 7/1989 | Pettersson |
| 4,946,319 A | | 8/1990 | Lyon et al. |
| 4,969,779 A | * | 11/1990 | Barten ........................ 407/114 |
| 5,205,680 A | | 4/1993 | Lindstedt |
| 5,342,151 A | | 8/1994 | Friedmann |
| D437,331 S | * | 2/2001 | Bernadic et al. ........... D15/139 |
| RE37,595 E | * | 3/2002 | Lindstedt ..................... 407/116 |
| 2003/0170081 A1 | | 9/2003 | Andersson et al. |

FOREIGN PATENT DOCUMENTS

WO    WO00/13824    3/2000

* cited by examiner

Primary Examiner—Willimon Fridie, Jr.
(74) Attorney, Agent, or Firm—Watts Hoffmann Co.

(57) ABSTRACT

A metal cutting insert having a pair of cutting portions disposed on either side of a shank portion which also includes a clamping structure engageable by a tool holder by which the metal cutting insert is held in an operative position. Each cutting portion includes a circular cutting edge that is defined by the juncture of a circular clearance surface and a frusto-conical, positive rake surface. The cutting edge is located in a common horizontal plane. A plurality of elongate spaced apart, radially directed recesses are symmetrically spaced with respect to the cutting edge and include outer ends that merge with the frusto-conical rake surface and inner ends which merge with a plateau-like surface having an upper surface located at a level higher than the cutting edge. The plateau-like surface defines a discontinuous circular edge in the form of arcuate ridges. A plurality of chip deflectors defined in part by shallow depressions are located between the associated recesses and extend from the rake surface and merge with an associated ridge. The recesses have a longitudinal extent greater than the chip deflector such that the ridges are disposed between associated recesses. The metal cutting insert is molded from a carbide or similar material and is adapted to be used as a single use insert. At least the cutting portion of the insert is coated with titanium nitride, titanium carbo-nitride, titanium aluminum nitride or other suitable material.

23 Claims, 3 Drawing Sheets

Fig.1

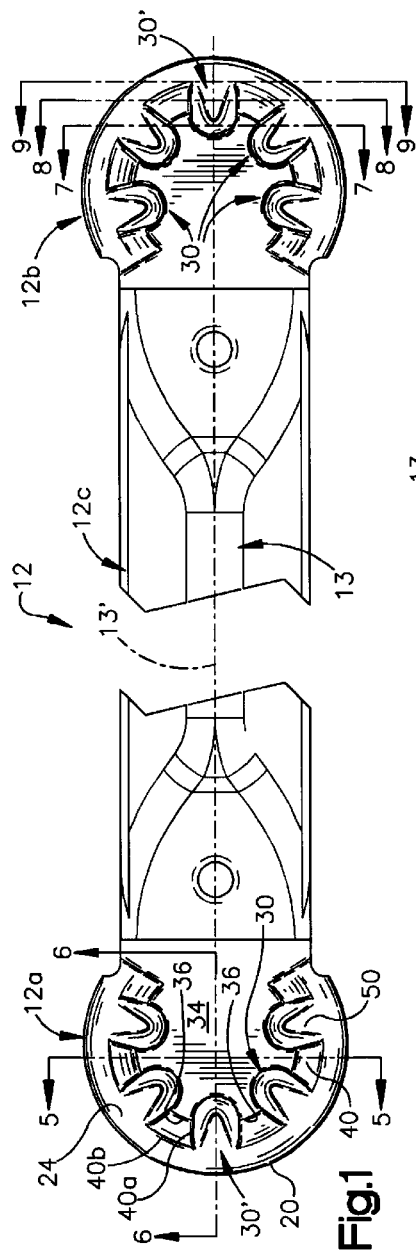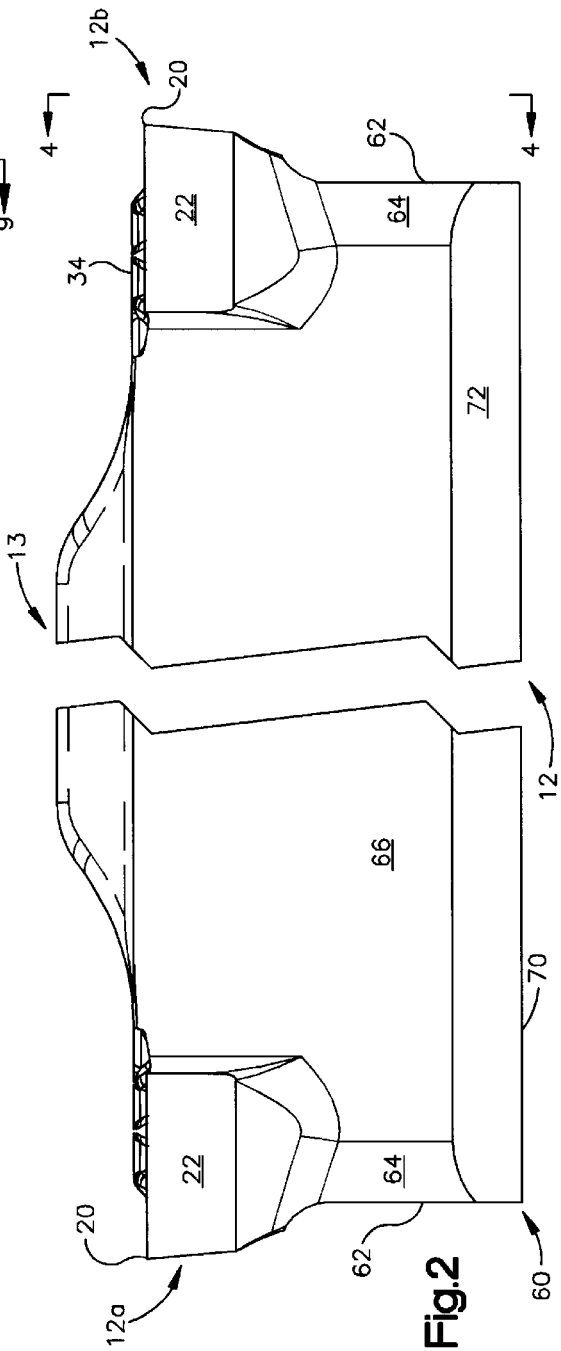

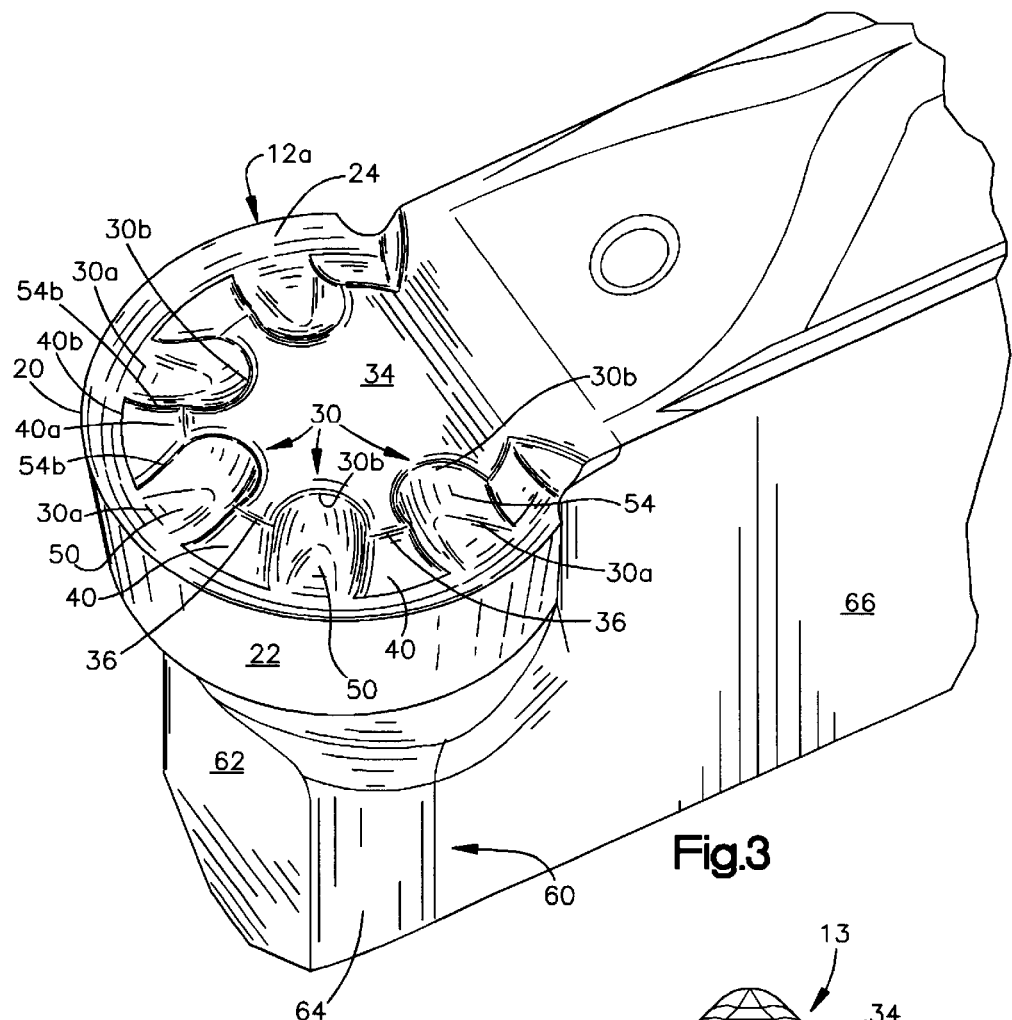
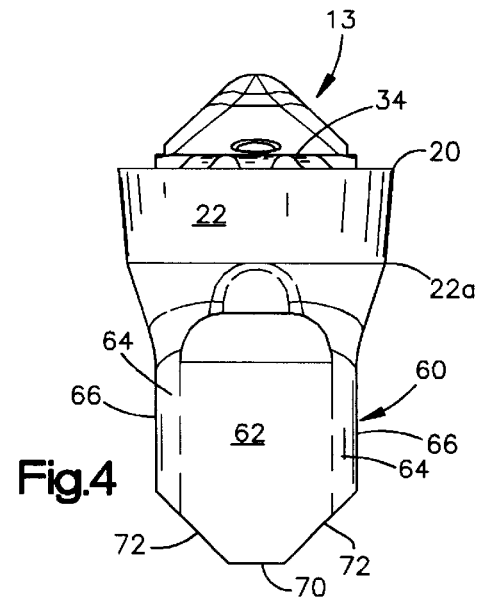

CUTTING INSERT

TECHNICAL FIELD

The present invention relates generally to the machining of rotating workpieces and, in particular, to a cutting insert that may be used to perform grooving, turning, boring, face grooving, face turning and profiling operations.

BACKGROUND ART

Metal cutting inserts, particularly the so-called dogbone shaped varieties, which have capabilities of removing metal in both the radial and axial directions have been known to the art for several decades. This style of insert initially was ground all over and offered no topographical features to reduce cutting pressures or assist in chip control.

Cutting inserts of the type to which this invention is directed, have circular cutting edges and are generally employed in turning operations where the cutting portion of the insert is designed to machine a workpiece into a relatively complicated shape. In these types of operations, the cutting insert is positioned and moved by a slide mechanism with respect to the workpiece. The slide mechanism for some operations may move the insert in a continuously changing direction in order to achieve the desired shape in the workpiece.

The continuous changes in direction of movement in the cutting insert and the changing contact point between the workpiece and the circular cutting edge of the insert make chip control more difficult.

Although cutting inserts with circular edges are commercially available, it is believed that many of the existing designs do not adequately deal with chip control over the range of speeds, feeds, variable depths of cut and materials available. Inadequate chip control can adversely affect the life of the tool and can also damage the workpiece.

Chip control is important on cast workpieces where changing surface contours result in variable depths of cut to be achieved by a given tool acting in a multi-axial mode. Absence of chip control during this type of operation can be inconvenient and costly.

Enhancements to the early inserts of this type offered a variety of chip controlling devices which provided some degree of chip control in both the radial and axial directions. However, these enhancements to chip control did not function optimally over the varying depths of cut and changing contours of the workpieces, especially at very shallow depths of cut.

Later advancements in the art placed a greater amount of emphasis on achieving chip control at shallow depths of cut but did so at the expense of increased cutting pressures and with some reduction in surface finish quality. Even further, some of the chip control devices which purported to reduce cutting pressure and improve finish were restricted in size or shape such that they could not offer chip control over a complete range of depths of cut in all cutting modes.

DISCLOSURE OF INVENTION

The present invention provides a new and improved cutting insert that is capable of performing multiple machining operations, such as turning, profiling, grooving, etc. and which includes chip controlling and chip breaking surfaces which improve chip management during its use.

According to the invention, the metal cutting insert has a substantially circular cutting edge defined by the juncture of a clearance surface and a circular rake surface. A plurality of elongate, spaced apart radially directed recesses have outer ends that merge with the circular rake surface and inner ends that merge with a plateau-like surface that is formed generally centrally with respect to the circular cutting edge and which has an upper surface located at a level higher than the cutting edge. The plateau-like surface defines a discontinuous circular edge in the form of arcuate ridges. A plurality of chip deflectors defined in part by shallow depressions are located between associated recesses and extend from the rake surface and merge with an associated ridge formed by the plateau-like surface.

According to the preferred embodiment, the rake surface which extends inwardly with respect to the cutting edge is frusto-conical in shape and is angled downwardly to define a positive rake surface. According to this preferred embodiment, the cutting edge itself is located in a common plane which is preferably coplanar with the machine tool center line.

In a more preferred embodiment, the recesses have a longitudinal extent that is greater than the chip deflectors, such that the ridges defined by the plateau-like surface are disposed between associated recesses.

In the exemplary embodiment, each recess includes a base surface that extends downwardly from the rake surface and merges with an upwardly extending arcuate wall that defines, at least in part, the inner end of its associated recess. Preferably, the base surface of the recess is substantially below the level of an adjacent chip deflector. In the preferred embodiment, each recess is a substantially constant transverse dimension and the chip deflectors have a decreasing transverse dimension, such that an outer end of each deflector has a transverse dimension substantially greater than an inner end of the chip deflector.

The disclosed surface configurations provide chip control under various operating parameters. For shallow depths of cut, the positive rake surface serves to deflect the chip into a tight spiral and direct it toward a chip deflector. Impact with a chip deflector will then break the tightly spiraled chip. At greater depths of cut, portions of the recesses will impede the flow of at least portions of the chip and which, in conjunction with the positive rake surface, will serve to further tighten the chip spiral and cause it to break into a shorter length. At still greater depths of cut, additional recesses will come into play and act to rigidize the chip by inducing a portion of it to flow into the recess, creating a rib in the chip. The positive orientation of both the chip deflectors and recesses ensures that chip breaking will occur with a minimal increase in cutting pressure.

The radial orientation and uniform spacing of the chip deflectors and recesses in conjunction with the positive rake surface provide for similar performance irrespective of the orientation of the insert and contact point along the cutting edge. The symmetrical orientation of the chip controlling devices ensures the same chip control capabilities irrespective of the direction of movement of the tool.

According to a further feature of the invention, the metal cutting insert preferably includes metal cutting portions disposed on either side of a shank portion. In the preferred construction, when one of the cutting portions is worn, the tool is removed from its tool holder and rotated 180° in order to position the opposite, unused cutting portion into a machining position. According to this feature, the cutting insert includes a protuberance that is centrally located with respect to the cutting portions and which is engageable by a clamp forming part of the cutting tool system and which secures the insert in a cutting position.

In the preferred construction, the insert is formed by a relatively hard material, such as carbide, cermet or ceramic. The insert may be molded using a powder metal technology that is known in the art. In the preferred embodiment, the insert is molded using known technology and is intended for single use. With the preferred construction, the cutting insert is disposed of after its cutting portions are worn and is not intended to be resharpened or remanufactured.

Additional features of the invention will become apparent and a fuller understanding obtained by reading the following detailed description made in connection with the accompanying drawings.

BRIEF DESCRIPTION OF DRAWINGS

FIG. 1 is a fragmentary, plan view of a cutting insert constructed in accordance with a preferred embodiment of the invention;

FIG. 2 is a side view of the cutting insert shown in FIG. 1;

FIG. 3 is an enlarged fragmentary, perspective view of a cutting portion of the cutting insert shown in FIG. 1;

FIG. 4 is an end view of the cutting insert as seen from the plane indicated by the line 4—4 in FIG. 2;

BEST MODE FOR CARRYING OUT THE INVENTION

Figure 5:
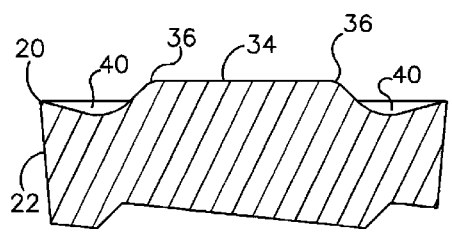
FIG. 5 is a fragmentary sectional view as seen from the plane indicated by the line 5—5 in FIG. 1.

FIG.1 illustrates the overall construction of a metal cutting insert 12 constructed in accordance with the preferred embodiment of the invention. In use, the insert is clamped in a tool holder (not shown). In general, the tool holder forms part of a slide mechanism which controls the positioning and movement of the cutting insert 12 with respect to a rotating workpiece (not shown) in order to perform a cutting or machining operation on the workpiece. The tool holder and/or the other components of the machine tool with which the cutting insert is used are well known in the art and do not form part of the present invention.

In the disclosed embodiment, the insert 12 includes a pair of cutting portions 12a, 12b disposed on either side of a shank portion 12c.In use, the shank portion 12c of the insert 12 is clamped to a tool holder which locates and supports one of the cutting portions i.e. 12a at a machining position. When the one cutting portion 12a is worn, the insert 12 is rotated 180° in the tool holder in order to locate the other cutting portion 12b at the machining position.

As seen best in FIGS. 2 and 4, the insert 12 includes an upwardly extending protuberance 13 which is engageable by a tool holder (not shown). The engagement of the protuberance 13 by the tool holder serves to rigidly mount the insert 12 in its operative position, with one of the cutting portions being presented in a position where it can perform machining operations on a rotating workpiece. The illustrated protuberance 13 should be considered but an example of how the disclosed insert can be held in a tool holder, and the present invention should not be considered limited to the illustrated tool holder engaging structure 13.

In the preferred embodiment, the cutting insert 12 is formed from a relatively hard material, such as carbide, cermet, ceramic, etc. Preferably, the insert is molded using a powder metal technology that is known in the art. The invention however contemplates other methods and technologies for forming or making the insert as well as materials other than those identified above.

Referring, in particular, to FIGS. 1–3, each cutting portion 12a, 12b includes a circular cutting edge 20. The cutting edge 20 is defined by the juncture of a clearance surface 22 and a circular, uniformly contoured rake surface 24. In the preferred and illustrated embodiment, this rake surface 24 is frusto-conical in configuration. As seen best in FIGS. 5 and 6, the rake surface 24 angles downwardly with the highest point of the rake surface being the cutting edge 20 thus defining a positive rake surface. According to this preferred embodiment, the cutting edge 20 is located in a common plane that is preferably coplanar with the center line of the machine tool (the orientation is seen best in FIG. 2). It should be understood, however, that the rake surface 24 may instead be planar and may extend from the cutting edge 20 in the same plane in which the cutting edge 20 is located. This latter configuration for the rake surface is also contemplated by the present invention.

A plurality of radially directed recesses 30 (see FIG. 3) are spaced equally with respect to the cutting edge 20. The outermost end 30a of each recess smoothly merges with the contoured rake surface 24.

Opposite or inner ends 30b (see FIG. 3) of each recess 30 merge with a plateau-like surface 34 which is formed generally centrally with respect to the cutting edge 20 and which as seen best in FIG. 2, is located at a level higher than the cutting edge 20. The plateau-like surface 34 also defines a discontinuous circular edge in the form of arcuate segments or ridges 36 that are disposed between associated recesses 30.

Referring also to FIG. 5, a chip deflector 40 (defined, at least in part by a shallow depression), having a longitudinal extent less than a longitudinal extent of each recess 30, is disposed between each recess. The chip deflector extends from the rake surface 24 and merges with an associated ridge 36 defined by the plateau surface 34.

Figure 6:
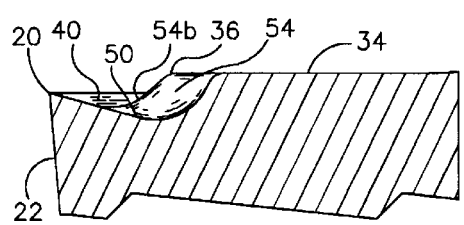
FIG. 6 is a fragmentary sectional view as seen from the plane indicated by the line 6—6 in FIG. 1.
Figure 7:
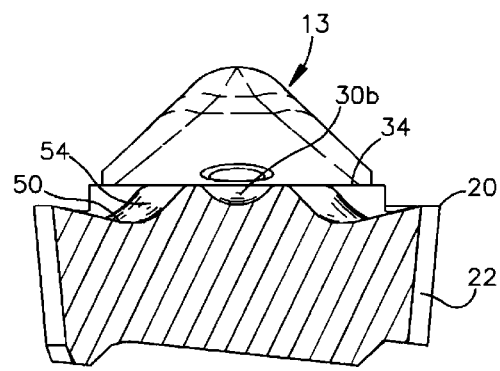
FIG. 7 is a fragmentary sectional view as seen from the plane indicated by the line 7—7 in FIG. 1.
Figure 8:
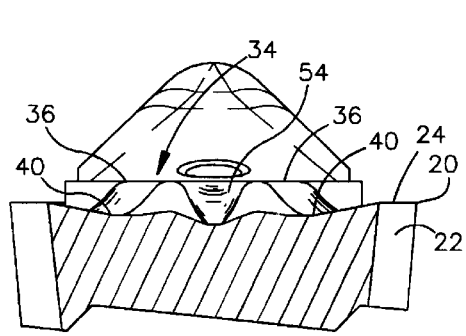
FIG. 8 is a fragmentary sectional view as seen from the plane indicated by the line 8—8 in FIG. 1; and, FIG. 9 is a fragmentary sectional view as seen from the plane indicated by the line 9—9 in FIG. 1.
Figure 9:
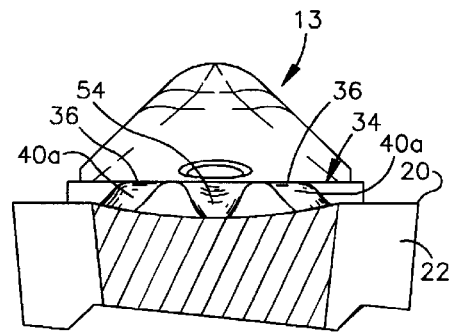

Referring, in particular, to FIGS. 3 and 6, each recess 30 includes a base surface 50 which extends downwardly from the contoured rake surface 24 and merges with an upwardly extending arcuate wall 54 which defines the back or inner end of the recess 30. As seen best in FIG. 6, the base surface 50 has a longitudinal or radial extent as measured from the rake surface 24 that is preferably greater than the radial extent of the chip deflector 40, and at its lowest level, is substantially below the level of the adjacent chip deflector 40. Again, as seen best in FIG. 6, the inner end of each recess is defined by the arcuate surrounding wall 54 which extends upwardly from the base 50 with side edges of the wall 54 merging with chip deflectors 40. The innermost section of the wall 54 extends upwardly from the base 50 and merges with the plateau 34.

In the preferred and illustrated embodiment, the width of each recess 30 is substantially equal for its full longitudinal extent. Because the recesses are oriented radially, the chip deflectors 40 disposed between each recess 30 have a decrease in transverse dimension, such that an inner end 40a of each chip deflector 40 that merges with the associated plateau ridge 36 has a width that is substantially narrower than the width of the chip deflector 40b at its radial outer edge 40b, i.e., where it joins the rake surface 24.

As seen best in FIG. 4, the clearance surface 22 which extends downwardly from the cutting edge 20 is also tapered such that a lower extreme 22a of the clearance surface 22 has a diameter that is smaller than a diameter defined by the upper extreme of the surface 22, i.e., the cutting edge 20.

The shank 12c, as seen best in FIGS. 3 and 4, includes a support portion 60 which extends below the clearance surface 22. The support 60 portion of the shank 12c is defined by a front planar face 62 and a pair of planar transition surfaces 64 which connect the front face 62 to planar side faces 66 of the shank 12c. The bottom of the insert 12 is defined by a bottom face 70 which is connected to the side faces 66 by a pair of angled faces 72.

It should be understood that the configuration and shape of the body of the insert below the cutting portion 12a (12b) of the insert 12 is intended to provide clearance between the overall insert and the piece being machined. The actual shape and configuration of the insert below the clearance surface 22 is not considered critical to the invention and other shapes and configurations are contemplated.

The disclosed insert is capable of efficient cutting in both radial and axial (sometimes termed "plunge" and "turn") modes of operation. The radial orientation of the recesses 30 in combination with the chip deflectors 40 that separate the recesses 30, provide effective chip control in both radial and axial modes of operation, as well as in a wide range of cutting speeds and depths of cut. Both the recesses 30 and chip deflectors 40 (which terminate at the arcuate ridges 36 defined by the plateau surface 34) separating the recesses 30, obstruct the unrestricted flow of chips thus resulting in smaller, controlled chips. The surface intersections provided by the recesses 30 and ridges 36 promote rigidizing of the chip as it forms along the portion of the cutting edge 20 in contact with the workpiece. The inner ends 30b of the recess walls 54, as well as the inner ends 40a of the chip deflectors 40 rise upwardly thus tightly rotating the chip upwardly while simultaneously causing localized stiffening of the chip which results in the early fracturing of the chip and smaller chip sizes. Both the inner ends 40a of the chip deflectors 40 and the arcuate end walls 54 of the recesses 30 define upwardly directed, chip deflector walls.

In order to achieve chip control across a variety of depths of cut, materials, speed, feeds, etc. a variety of chip controlling features is synergistically employed. For shallow depths of cut, the positive rake surface 24 serves to deflect the chip into a right spiral and direct it toward the chip deflector 40. Impact with the chip deflector 40 will then break the tight spiral chip. At greater depths of cut, portions of the recesses 30 will impede the flow of a portion of the chip which, in conjunction with the effects of the rake surface 24, serve to further tighten the chip spiral and break it into a shorter length. At still greater depths of cut a second and third recess 30 will act to rigidize the chip by inducing a portion of it to flow into the recess, creating a rib in the chip. Additionally, greater contact with the chip deflectors 40 will rotate the chip more quickly, causing it to readily break. The positive orientation of both the deflectors 40 and recesses 30 insures that this chip breaking will occur with minimum increase in cutting pressure—an especially important feature for castings of thin section size.

The radial orientation and uniform radial spacing of the chip deflectors 40 and recesses 30 in conjunction with the uniform positive rake surface 24 provides for similar performance irrespective of the orientation of the cutting surface and related contact point along the cutting edge 20. The symmetrical orientation of these chip control devices about the center line of the insert 12 insures the same chip control capabilities irrespective of the direction of multi-axial movement of the tool.

The positioning of the central recess 30' on the insert's center line 13' also insures that any plunge mode grooving will generate a chip with a central rib generated by flow into the recess 30 and resulting in contact with the back wall 36 of the recess which will result in the rapid rotation of the chip into a clockspring form. Flow of the chip into this central recess 30 will also result in a narrowing of the chip to a width less than the width of the insert, resulting in a chip that is more easily ejected from the groove.

In the preferred embodiment, the cutting insert including the cutting portions 12a, 12b and shank 12c are molded using a known powder metal technology. Using this technology, a relatively inexpensive throw-away metal cutting insert can be created having extensive cutting and chip control capabilities. The metal cutting insert is capable of many cutting operations and is intended to be disposed of once both cutting portions are worn and is not intended to be resharpened or remanufactured.

As indicated above, in the preferred embodiment, the insert is molded. When a molding process is employed to produce the cutting insert of the present invention, it should be understood that the surface configurations illustrated in the Figures may not be as sharply defined as shown in the Figures. In addition, it is customary to coat the inserts following the molding process with a coating such as titanium nitride, titanium carbo-nitride or titanium aluminum nitride, which improves cutting performance and the life of the insert. The use of a coating may also make the disclosed surface configurations less visually apparent. Nevertheless, cutting inserts having the disclosed features but with less sharply defined surface configurations are contemplated by the present invention.

Although the invention has been described with a certain degree of particularity, it should be understood that those skilled in the art can make various changes to it without departing from the spirit or scope of the invention as hereinafter claimed.

I claim:

1. A metal cutting insert having a substantially circular cutting edge defined by the juncture of a clearance surface and a circular rake surface, a plurality of elongate, spaced apart, radially directed recesses having outer ends that merge with said rake surface and inner ends merging with a plateau-like surface, the plateau-like surface being formed generally centrally with respect to the circular cutting edge and having an upper surface located at a level higher than the cutting edge, the plateau-like surface defining a discontinuous circular edge in the form of arcuate ridges, a plurality of chip deflectors defined in part by shallow depressions that are located between associated recesses and which extend from said rake surface and merge with an associated ridge.

2. The metal cutting insert of claim 1, wherein said rake surface is substantially frusto-conical in configuration with such that the highest point of the rake surface is the cutting edge thereby defining a positive rake surface.

3. The metal cutting insert of claim 1, wherein said recesses have a longitudinal extent greater than said chip deflectors, such that said ridges are disposed between associated recesses.

4. The metal cutting insert of claim 1, wherein each recess includes a base surface which extends downwardly from said rake surface and merges with an upwardly extending arcuate wall that defines, at least in part, the inner end of its associated recess.

5. The metal cutting insert of claim 4, wherein the base surface of said recess is below the level of an adjacent chip deflector.

6. The metal cutting insert of claim 5, wherein each recess has a substantially constant transverse dimension and said chip deflectors have a decreasing transverse dimension such that an outer end of said chip deflector has a transverse dimension greater than an inner end of said chip deflector.

7. The metal cutting insert of claim 1, wherein said cutting insert includes a raised protuberance spaced inwardly from the circular cutting edge which provides a clamping surface for holding said cutting insert in an associated insert holder.

8. The metal cutting insert of claim 1, wherein said circular cutting edge, rake surface and clearance surface and associated chip controlling structure are formed on opposite ends of an insert body and separated by an intermediate section, such that said insert is reversible by rotating the insert 180°.

9. A metal cutting insert, comprising:
   a) a pair of cutting portions disposed on either side of a shank portion;
   b) clamping structure engageable by a cutting insert holder by which said metal cutting insert is held in an operative position at which one of said cutting portions is located in an operative position with respect to a rotating workpiece;
   c) at least one of said cutting portions including:
      i) a circular cutting edge defined by a juncture of a clearance surface and a contoured rake surface;
      ii) a plurality of elongate, spaced apart, radially directed recesses having outer ends that merge with said contoured rake surface and inner ends merging with a plateau-like surface, the plateau-like surface being formed generally centrally with respect to the circular cutting edge and having an upper surface located at a level higher than the cutting edge, the plateau-like surface defining a discontinuous circular edge in the form of arcuate ridges, a plurality of chip deflectors defined in part by shallow depressions that are located between associated recesses and which extend from said rake surface and merge with an associated ridge.

10. The metal cutting insert of claim 9, wherein said rake surface is substantially frusto-conical such that the highest point of the rake surface is the cutting edge thereby defining a positive rake surface.

11. The metal cutting insert of claim 9, wherein said recesses have a longitudinal extent greater than said chip deflectors, such that said ridges are disposed between associated recesses.

12. The metal cutting insert of claim 9, wherein said cutting insert includes a raised protuberance spaced inwardly from the circular cutting edge which provides a clamping surface for holding said cutting insert in an associated insert holder.

13. The metal cutting insert of claim 9, wherein said cutting edge is located in a common horizontal plane.

14. The metal cutting insert of claim 9, wherein said one cutting portion is molded from a carbide material.

15. The metal cutting insert of claim 9, wherein said insert is entirely molded from a carbide material and is adapted to be used as a single use carbide insert.

16. The metal cutting insert of claim 9, wherein said insert is molded from cermet material.

17. The metal cutting insert of claim 9, wherein said insert is molded from a ceramic material.

18. A metal cutting insert having a substantially circular cutting edge defined by the juncture of a clearance surface and a frusto-conical, positive rake surface, a plurality of elongate, spaced apart, radially directed recesses having outer ends that merge with said rake surface and inner ends merging with a plateau-like surface, the plateau-like surface being formed generally centrally with respect to the circular cutting edge and having an upper surface located at a level higher than the cutting edge, the plateau-like surface defining a discontinuous circular edge in the form of arcuate ridges, a plurality of chip deflectors defined in part by shallow depressions that are located between associated recesses and which extend from said frusto-conical rake surface and merge with an associated ridge, said recesses having a longitudinal extent greater than said chip deflector, such that said ridges are disposed between associated recesses and each recess having a base surface that is below the level of an adjacent chip deflector.

19. The cutting insert of claim 18, wherein the base surface of each recess extends downwardly from the frusto-conical rake surface and merges with an upwardly extending arcuate wall that defines, at least in part, the inner end of its associated recess.

20. The cutting insert of claim 18, wherein each recess has a substantially constant transverse dimension and said chip deflectors have decreasing transverse dimension, such that an outer end of each chip deflector has a transverse dimension greater than an inner end of said chip deflector.

21. The metal cutting insert of claim 18, wherein said circular cutting edge, frusto-conical rake surface and clearance surface and associated chip controlling structure are formed on opposite ends of an insert body and separated by an intermediate section, such that said insert is reversible by rotating the insert 180°.

22. The metal cutting insert of claim 21, wherein said insert is entirely molded from a carbide material and is adapted to be used as a single use carbide insert.

23. The metal cutting insert of claim 22, wherein said insert is coated with one of the following materials (titanium nitride, titanium carbo-nitride, titanium aluminum nitride).

* * * * *